(12) United States Patent
Mahmood et al.

(10) Patent No.: US 6,497,441 B1
(45) Date of Patent: Dec. 24, 2002

(54) MULTIPURPOSE CONSOLE

(75) Inventors: Nicole M. Mahmood, New Carlisle, OH (US); Kenneth Alan Gassman, Springboro, OH (US); Frank X Kreiling, Bloomfield Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/723,734

(22) Filed: Nov. 28, 2000

(51) Int. Cl.$^7$ .............................................. B62D 33/04
(52) U.S. Cl. .................. 296/24.1; 296/37.8; 296/37.14; 224/400; 224/484; 224/926; 224/929
(58) Field of Search ................ 296/37.14, 37.8, 296/24.1; 224/275, 400, 484, 926, 929; 248/503

(56) References Cited

U.S. PATENT DOCUMENTS

| | | | | |
|---|---|---|---|---|
| 2,584,435 A | * | 2/1952 | Doerr | 165/135 |
| 3,193,326 A | | 9/1963 | Smith | 297/257 |
| 3,721,434 A | | 3/1973 | Spies | 269/328 |
| 3,732,955 A | * | 5/1973 | Carter et al. | 190/109 |
| 3,808,401 A | * | 4/1974 | Wright et al | 165/58 |
| 3,949,902 A | * | 4/1976 | Thompson | 296/22 |
| 4,106,829 A | * | 8/1978 | Dolle et al. | 224/275 |
| 4,733,901 A | * | 3/1988 | Okuyama | 296/37.8 |
| 4,756,573 A | | 7/1988 | Simin et al. | 297/250 |
| 4,796,791 A | * | 1/1989 | Goss et al. | 108/44 |
| 4,832,241 A | | 5/1989 | Radcliffe | 224/275 |
| 4,846,257 A | * | 7/1989 | Wallace et al. | 126/681 |
| 4,867,498 A | * | 9/1989 | Delphia et al. | 296/37.7 |
| 5,067,417 A | | 11/1991 | Marmentini et al. | 108/36 |
| 5,106,143 A | * | 4/1992 | Soeters | 296/37.8 |
| 5,244,278 A | | 9/1993 | Robitaille | 383/4 |
| 5,338,081 A | | 8/1994 | Young et al. | 296/37.14 |
| 5,358,307 A | * | 10/1994 | Shafer et al. | 224/275 |
| 5,397,160 A | | 3/1995 | Landry | 296/37.8 |
| 5,439,253 A | * | 8/1995 | Trubiano | 280/33.993 |
| 5,492,068 A | | 2/1996 | McKee | 108/44 |
| 5,615,433 A | | 4/1997 | Martin | 5/655 |
| D394,581 S | * | 5/1998 | Paris | D7/323 |
| 5,775,771 A | | 7/1998 | La Cour et al. | 297/238 |
| 5,813,200 A | | 9/1998 | Jacoby et al. | 53/567 |
| 5,823,599 A | * | 10/1998 | Gray | 296/37.8 |
| 5,852,838 A | | 12/1998 | Johnson | 5/655 |
| 5,911,471 A | | 6/1999 | Benedict et al. | 297/158.1 |
| 5,926,909 A | | 7/1999 | McGee | 15/339 |
| 5,968,396 A | | 10/1999 | Rodriguez | 219/523 |
| 6,032,840 A | * | 3/2000 | Gregory | 224/275 |
| 6,055,688 A | * | 5/2000 | Helmsderfer et al. | 5/136 |
| 6,116,674 A | * | 9/2000 | Allison et al. | 296/37.8 |
| 6,128,890 A | | 10/2000 | Firth | 53/567 |
| 6,135,529 A | | 10/2000 | De Angelis et al. | 296/37.8 |
| 6,245,160 B1 | * | 7/2001 | Marriott et al. | 296/24.1 |
| 6,264,261 B1 | | 7/2001 | Krafcik | 296/37.8 |
| 6,330,337 B1 | | 12/2001 | Nicholson et al. | 381/86 |

* cited by examiner

*Primary Examiner*—D. Glenn Dayoan
*Assistant Examiner*—Lori L. Coletta
(74) *Attorney, Agent, or Firm*—Kathryn A. Marra

(57) ABSTRACT

A multipurpose console for use in a vehicle having a support structure having an internal compartment, a latching mechanism being fixedly secured to a lower surface of the support structure and providing a means for releasably engaging a mounting member of the vehicle. The internal compartment has a lid pivotally secured to an upper portion of the support structure and moves between a first position and a second position. The lid covers the internal compartment when the lid is in the first position and the lid has an upper portion and a lower portion. The upper portion is pivotally secured to the lower portion for movement between the first position and the second position. The upper portion and the lower portion define a surface area for changing a child's diaper when the upper portion is in the second position. The internal compartment provides a plurality of storage areas for products necessary to facilitate the changing of the child's diaper. The multipurpose console also includes an electronic entertainment device.

26 Claims, 16 Drawing Sheets

MULTIPURPOSE CONSOLE

TECHNICAL FIELD

The present invention is related generally to a multipurpose console and more particularly, a multipurpose console for vehicle applications.

BACKGROUND OF THE INVENTION

Some vehicles, particularly larger sized vehicles, have removable bucket seats for altering the seating arrangements and storage areas of the vehicle in accordance with the user's preference.

These removable seats each have a latching mechanism for securing and engaging a latching mechanism such as a mounting member fixedly secured to the vehicle floor or frame. The latching mechanisms each have an associated spring-loaded latching mechanism for anchoring the seats in place.

The vehicle seats can be easily removed by depressing a latching lever and lifting the seats from the mounting brackets in the floorboard of the vehicle. In some applications, several such seats are mounted to the vehicle, particularly in the second and third rows of seats.

In order to provide the vehicle occupants with amenities, vehicle consoles for storage of articles and the like are permanently mounted between the seats of the vehicle or, in some cases, are included in fixed armrests.

Consoles may include accessories such as cupholders and storage bins, although existent consoles provide the vehicle occupants with minimal storage and usefulness, due in part to the restricted space between vehicle seats.

SUMMARY OF THE INVENTION

A removable floor-mounted multipurpose console that utilizes the relatively large space created when a removable seat has been removed from a vehicle. The console can be removably attached in the location where a seat has been removed. The removable floor-mounted console of the present invention includes a frame having a base with a seat mounting mechanism attached thereto for removably mounting the base and frame to the vehicle in an area where a seat has been removed. Typically, the seat mounting structure is a four point connection to the vehicle floor and provides a relatively wide base from which to provide a frame for including a variety of console accessories.

In an exemplary embodiment of the invention, the multipurpose console includes a support structure having an internal compartment and a latching mechanism being fixedly secured to a lower surface of the support structure. The latching mechanism provides a means for releasably engaging a mounting member of the vehicle. The internal compartment has a lid pivotally secured to an upper portion of the support structure and moves between a first position and a second position. The lid covers the internal compartment when the lid is in the first position, and the lid has an upper portion and a lower portion. The upper portion is pivotally secured to the lower portion for movement between the first and the second position. The upper portion and the lower portion define a surface area for changing a child's diaper when the upper portion is in the second position. The internal compartment provides a plurality of storage areas for products necessary to facilitate the changing of the child's diaper. The multipurpose console also includes an electronic entertainment device.

The above-described and other features and advantages of the present invention will be appreciated and understood by those skilled in the art from the following detailed description, drawings, and appended claims.

BRIEF DESCRIPTION OF THE DRAWINGS

FIG. 17 is a perspective view of an alternative embodiment of the present invention;

DETAILED DESCRIPTION OF THE PREFERRED EMBODIMENT

Referring now to FIGS. 1–5, a multipurpose console 10, constructed in accordance with an exemplary embodiment of the present invention is illustrated. Console 10 is a childcare console providing features for assisting and attending to the care of an infant.

Console 10 is constructed out of a durable, lightweight, easily-molded material such as plastic and generally has a rectangular configuration. In an exemplary embodiment, console 10 has an overall length of approximately 857.5 mm, a width of approximately 480.00 mm, and a height of approximately 331.00 mm. Of course, console 10 can be constructed out of other materials and in a variety of sizes and configurations.

Console 10 has a latching mechanism 12 disposed at a bottom 14 of console 10. Latching mechanism 12 provides a means for securing and releasing console 10 from a securement feature of a vehicle. For example, latching mechanism 12 is similar to those employed on removable vehicle seats, in particular the mechanisms employed by seats used in vans having a plurality of seats with an easily accessible quick release mechanism. Of course, and as applications may require, alternative latching mechanisms providing a quick release securement to an existing mounting member for a vehicle seat may be employed.

Figure 10:
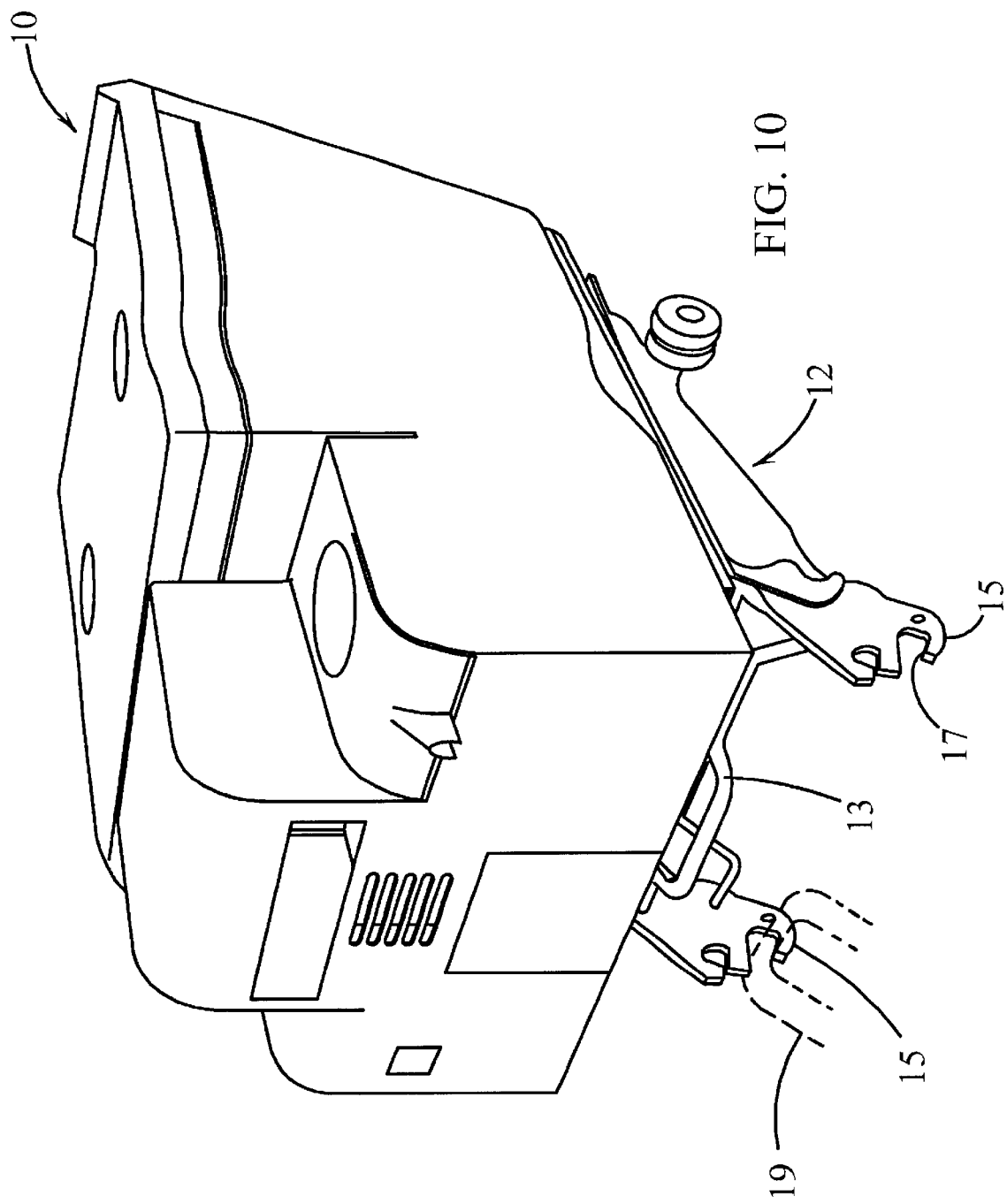
FIG. 10 is a perspective view of a multipurpose console constructed in accordance with an exemplary embodiment of the present invention.
Figure 11:
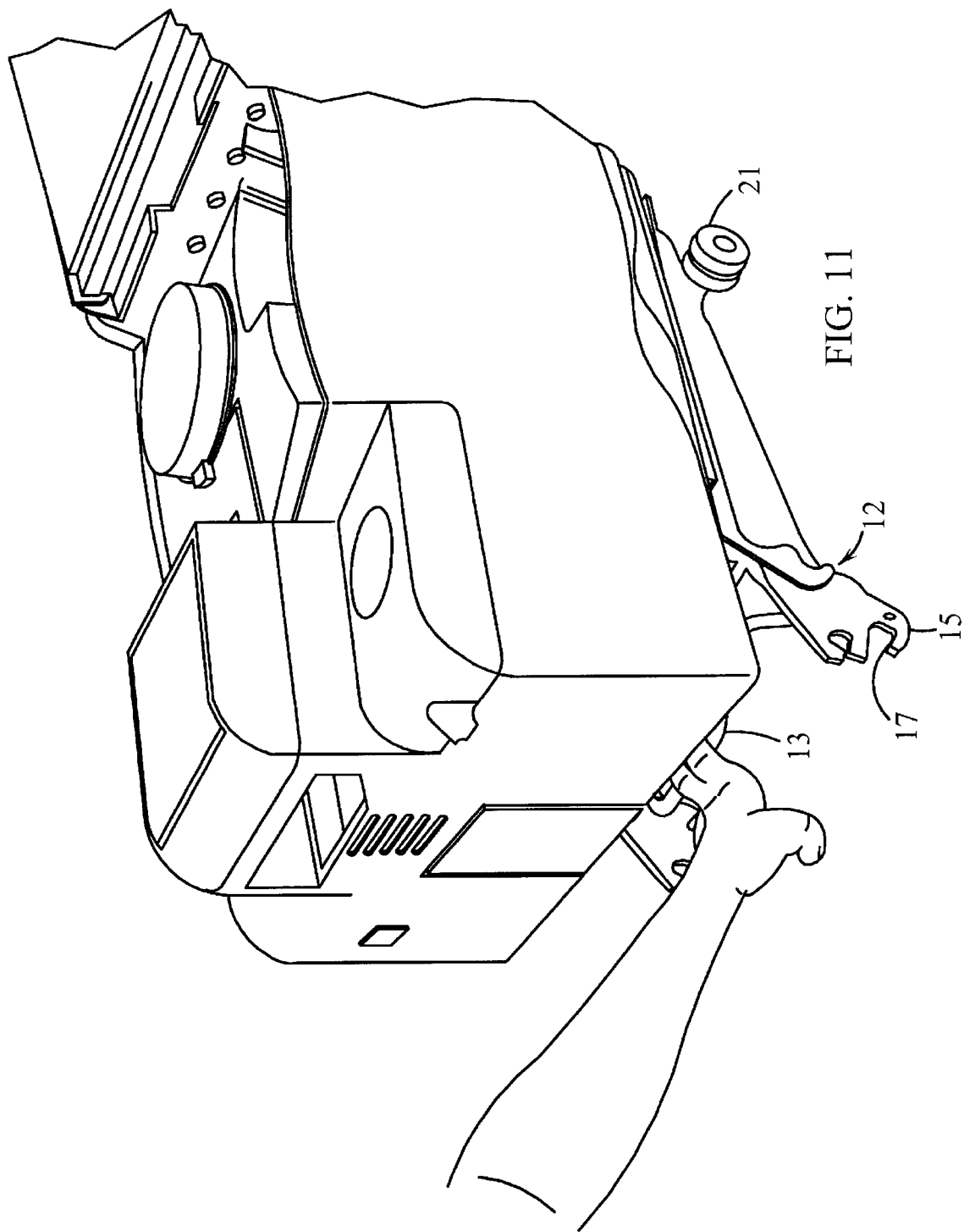
FIG. 11 is a perspective view illustrating the operation of the locking mechanism of the multipurpose console.

Latching mechanism 12 includes a spring biased release mechanism 13 which allows a user to disengage and engage console 10 from a securement member of a vehicle. For example, and referring now to FIGS. 10–12, latching mechanism 12 has a pair of latching members 15. Latching members 15 are configured to have a receiving area 17. Receiving area 17 receives a portion of a securement member 19 (illustrated by the dashed lines in FIG. 10). In an exemplary embodiment, securement member 19 is an engagement member used for securing the removable seats of a vehicle.

Figure 12:
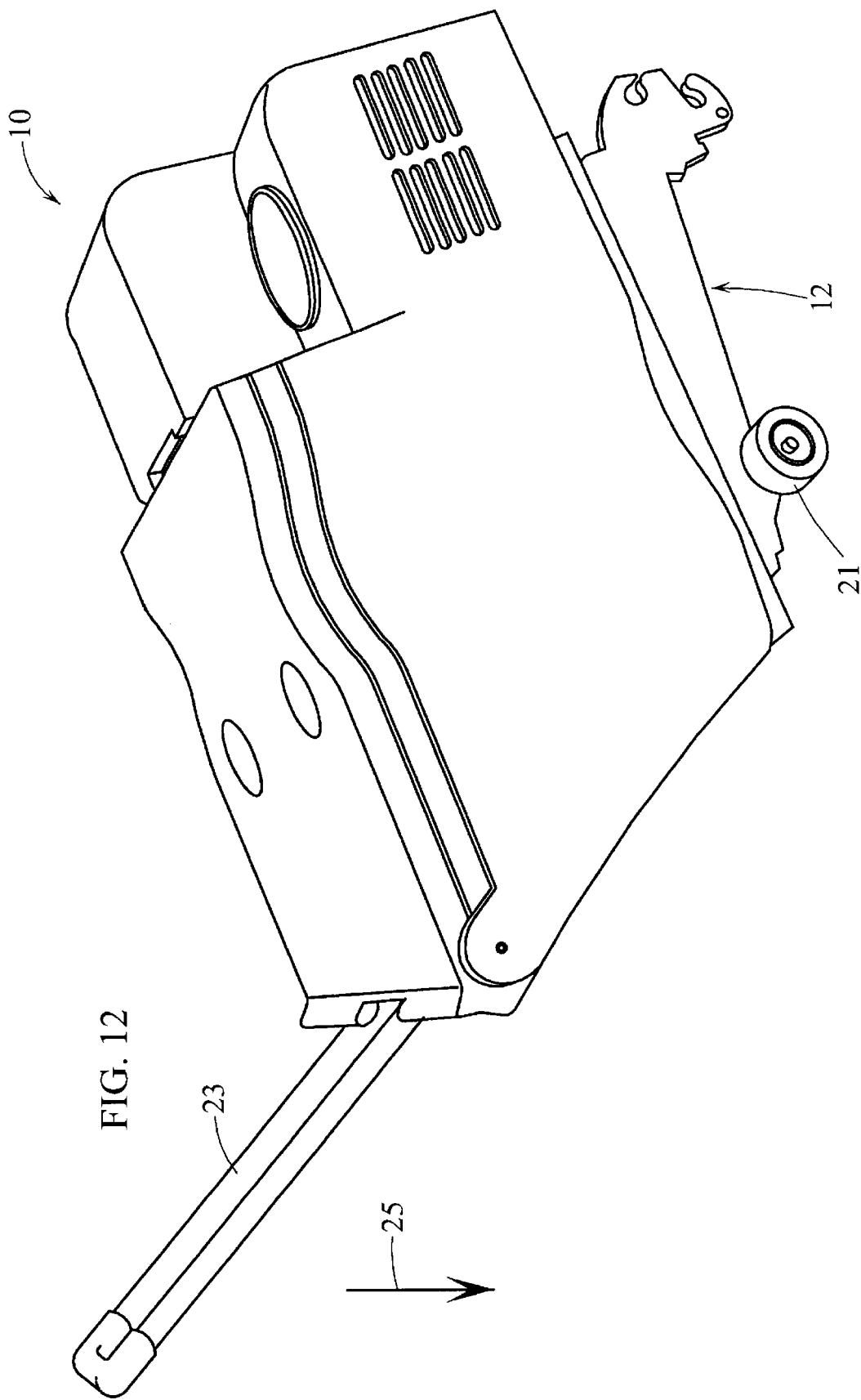
FIG. 12 is a perspective view of a multipurpose console constructed in accordance with an exemplary embodiment of the present invention.

In addition, and as an alternative latching mechanism 12 is equipped with a pair of wheels 21 and console 10 is provided with a telescoping handle 23. Accordingly, and as illustrated in FIG. 12, console 10 becomes a movable item has a downward force in the direction of arrow 25 is applied to handle 23.

Figure 1:
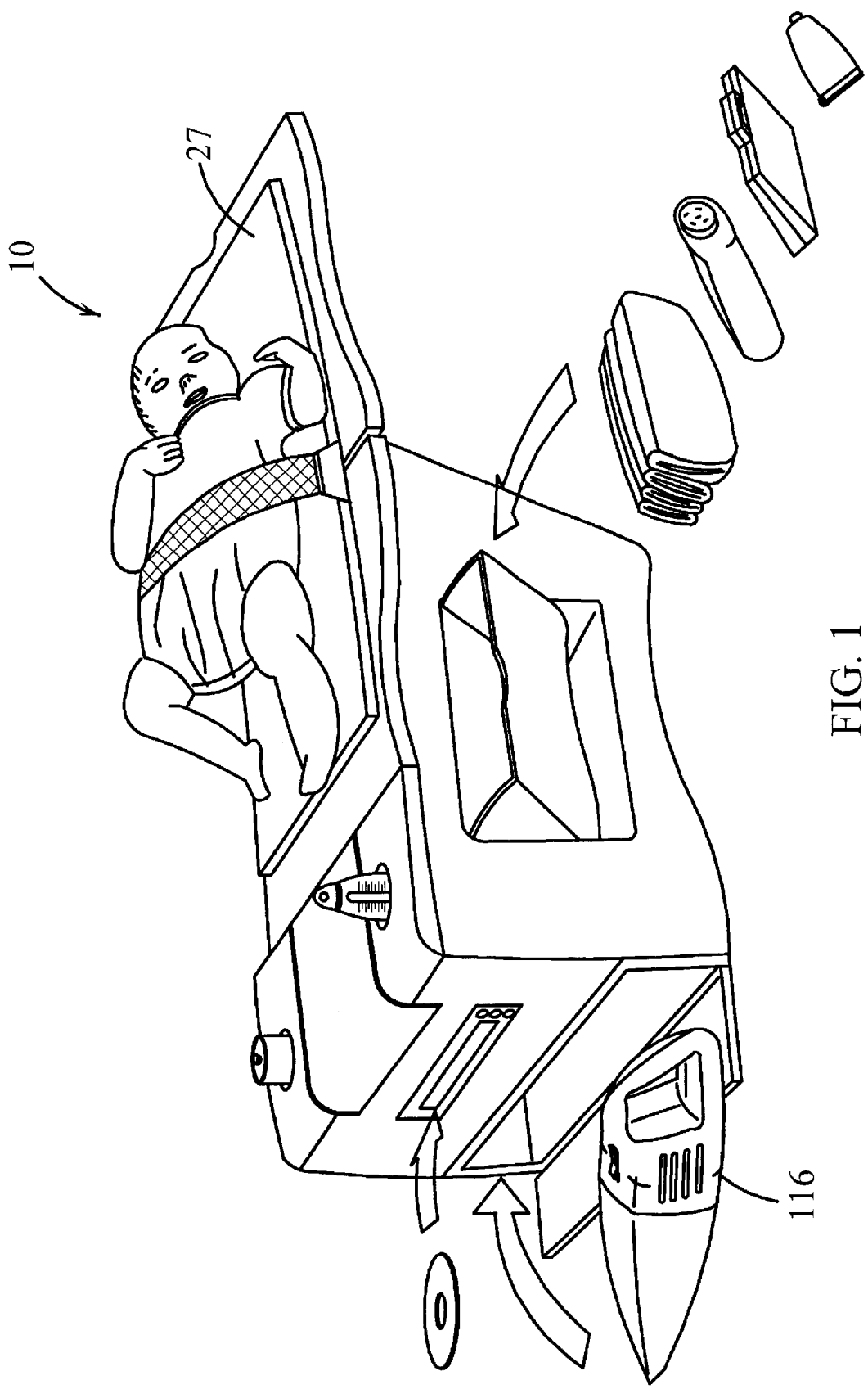
FIG. 1 is a perspective view of a multipurpose console constructed in accordance with the present invention.
Figure 2:
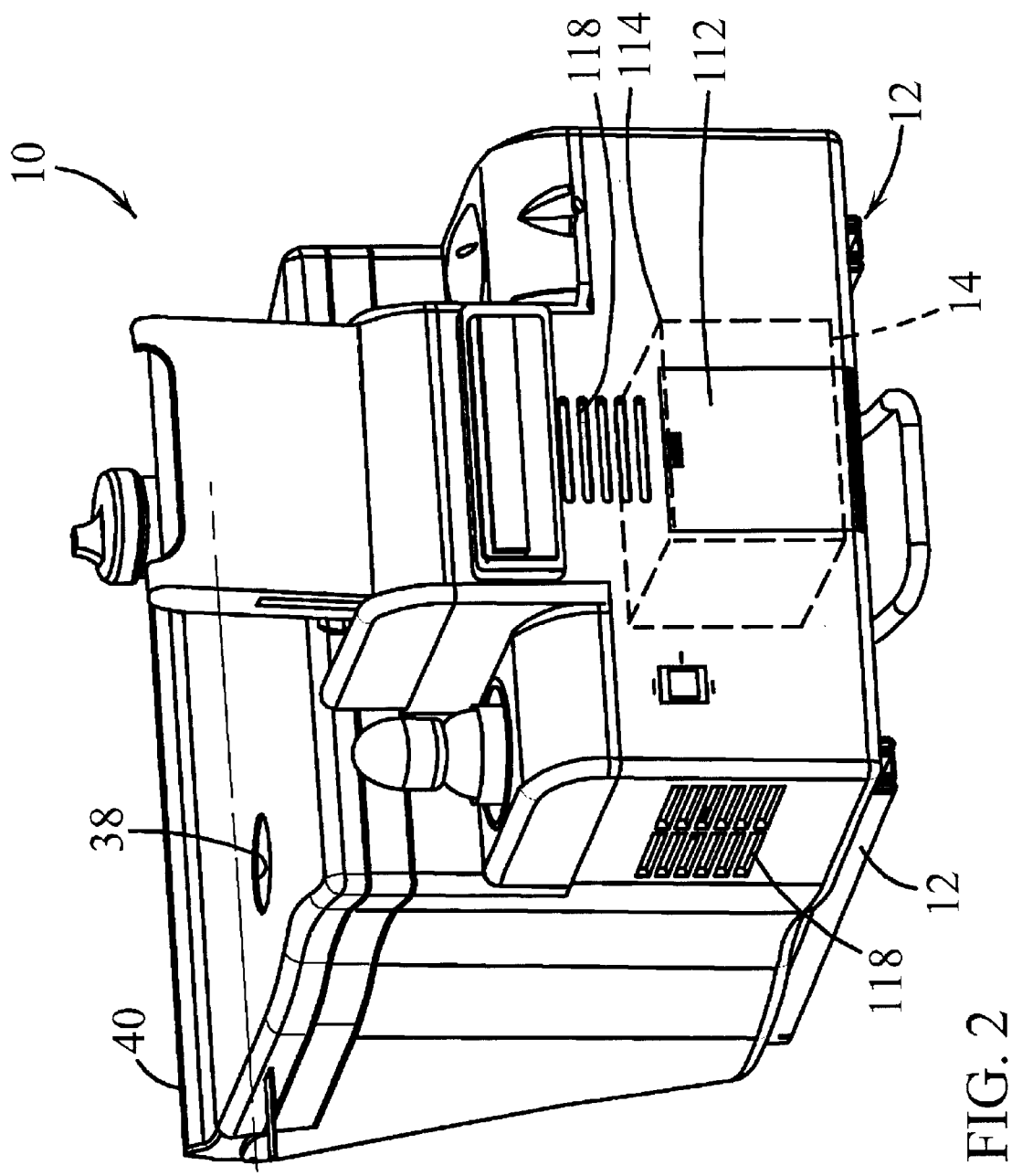
FIG. 2 is a perspective view of a multipurpose console constructed in accordance with an exemplary embodiment of the present invention.
Figure 3:
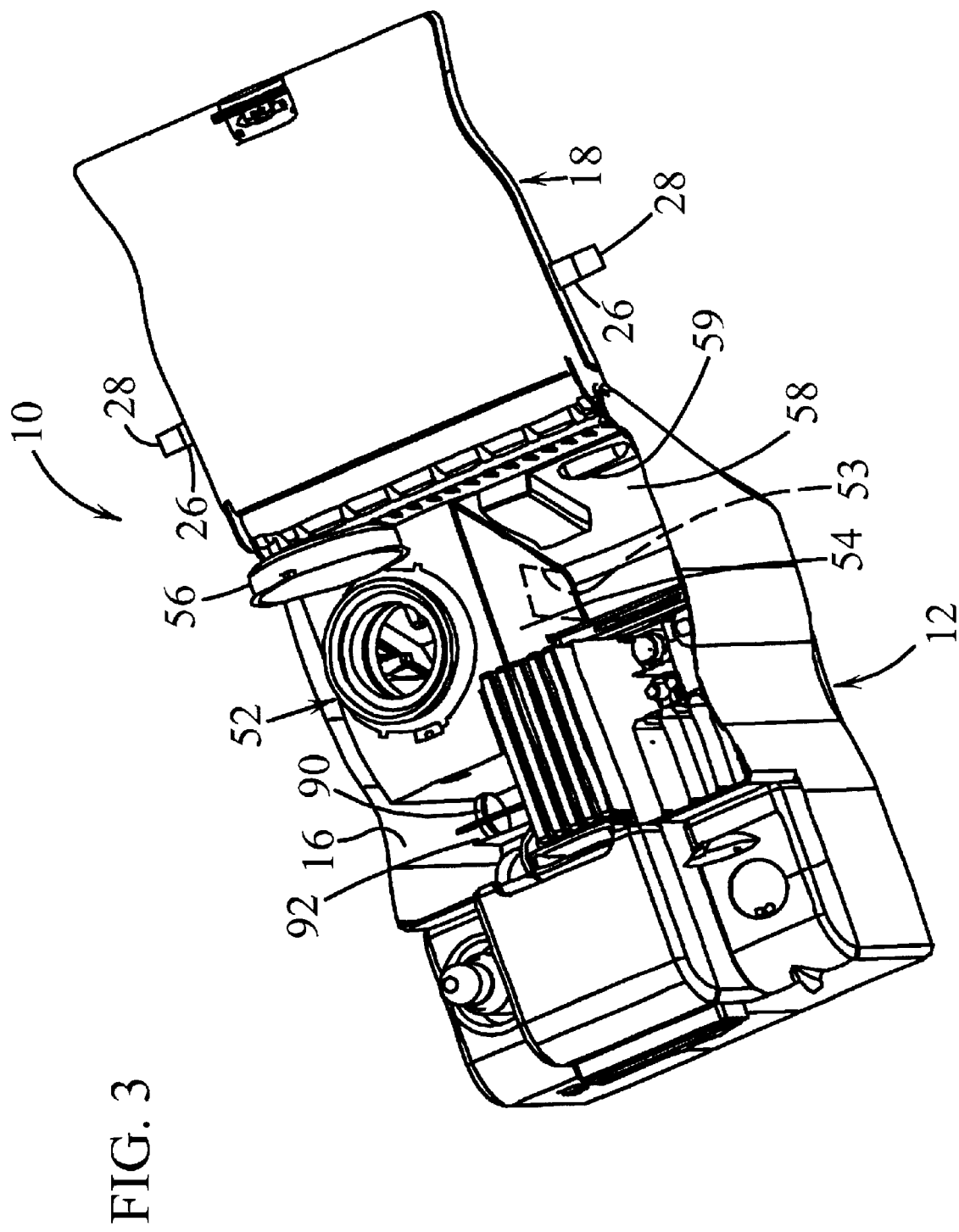
FIG. 3 is a perspective view illustrating features of a multipurpose console constructed in accordance with an exemplary embodiment of the present invention.
Figure 4:
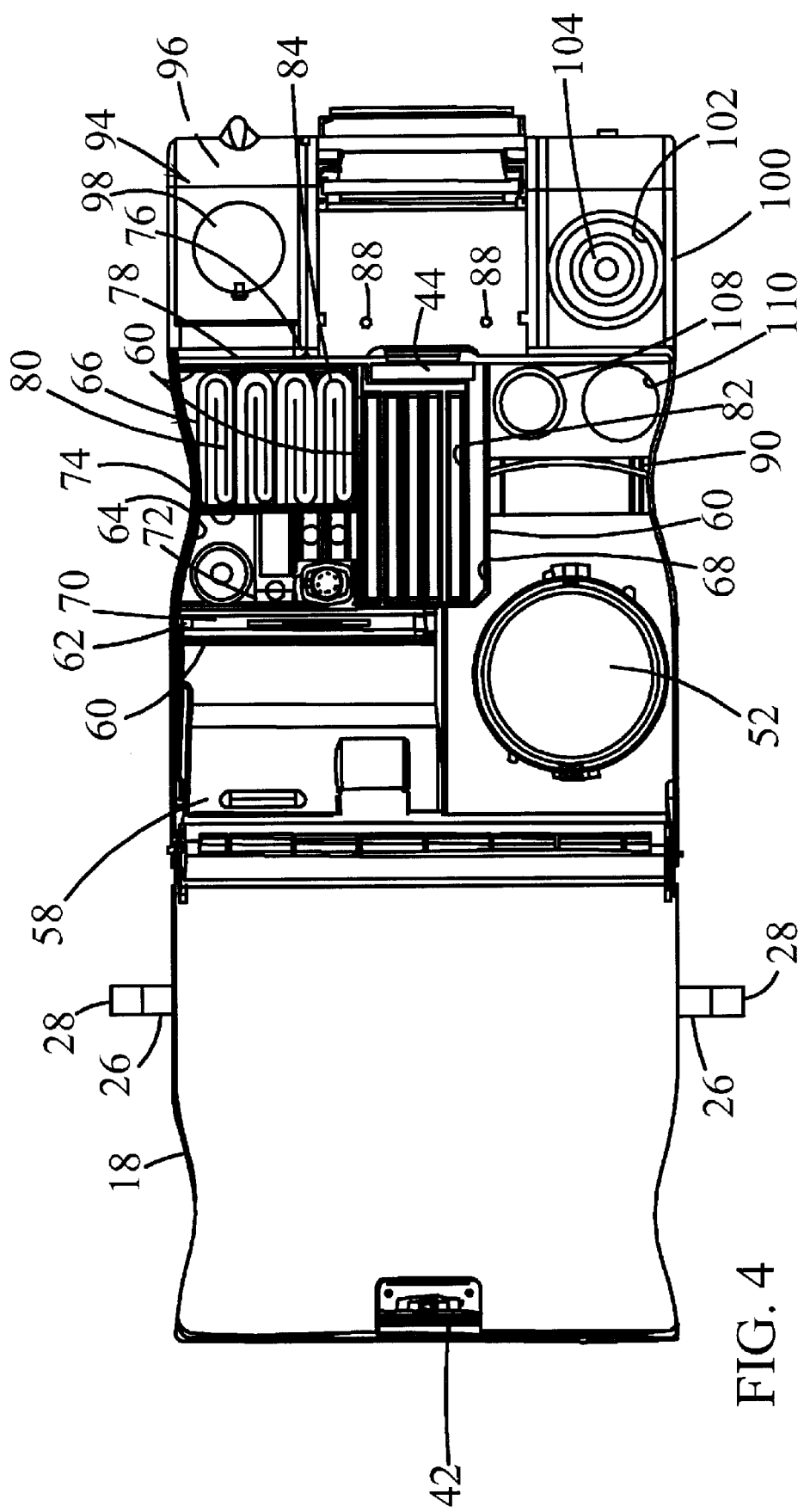
FIG. 4 is a top plan view illustrating features of a multipurpose console constructed in accordance with an exemplary embodiment of the present invention.
Figure 5:
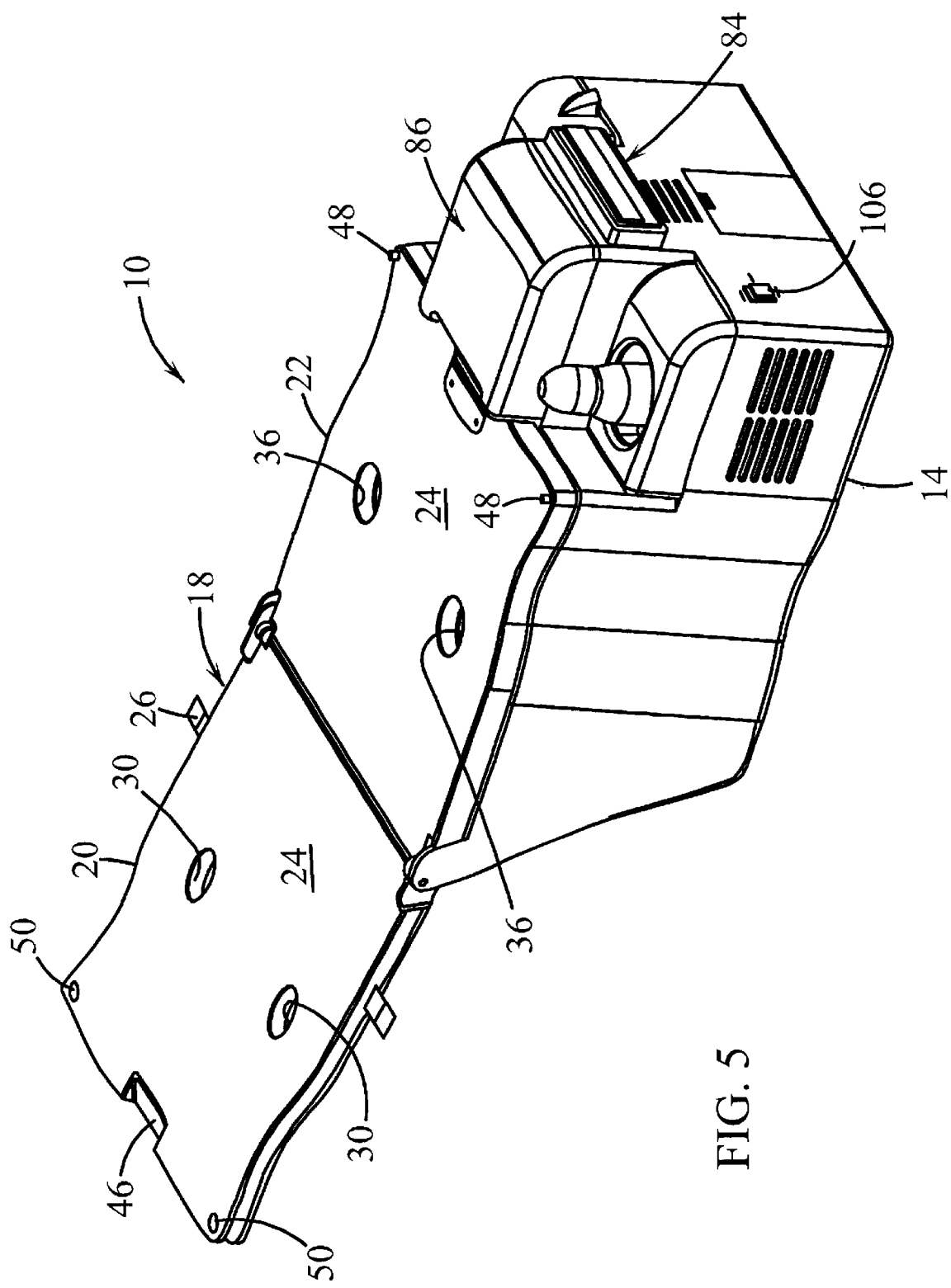
FIG. 5 is a perspective view illustrating features of a multipurpose console constructed in accordance with an exemplary embodiment of the present invention.
Figure 6:
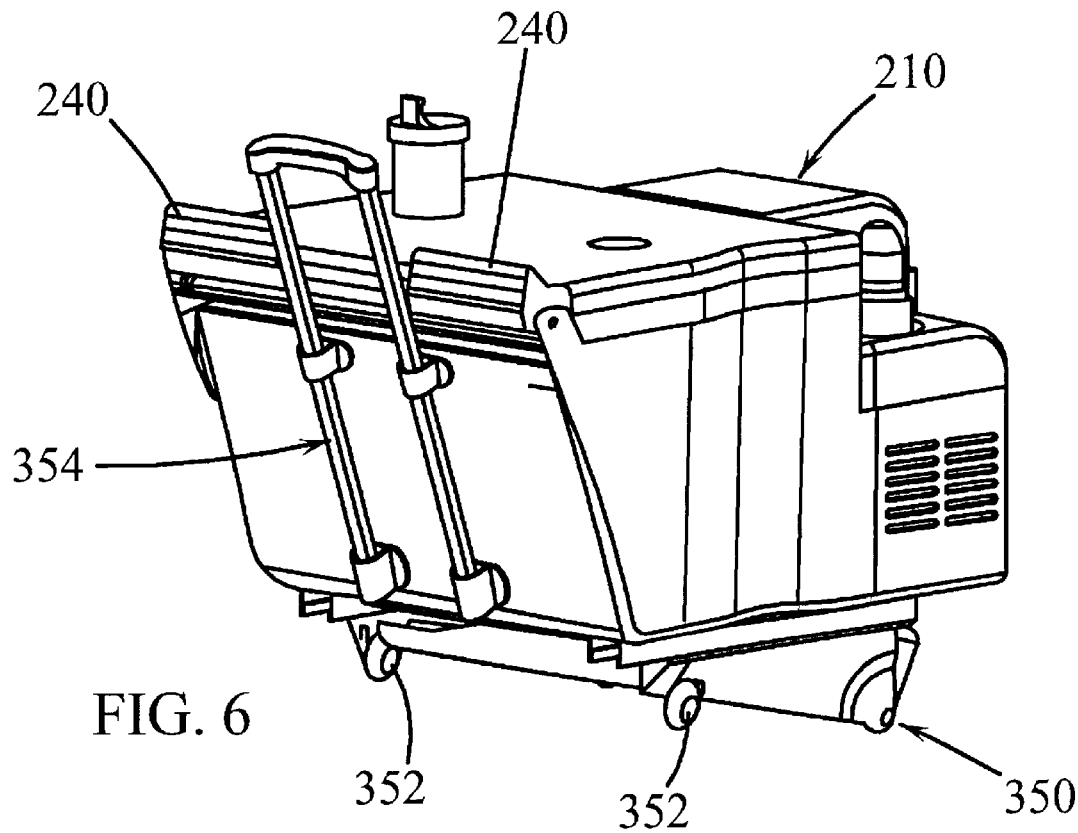
FIG. 6 is a perspective view of an alternative embodiment of the present invention.
Figure 7:
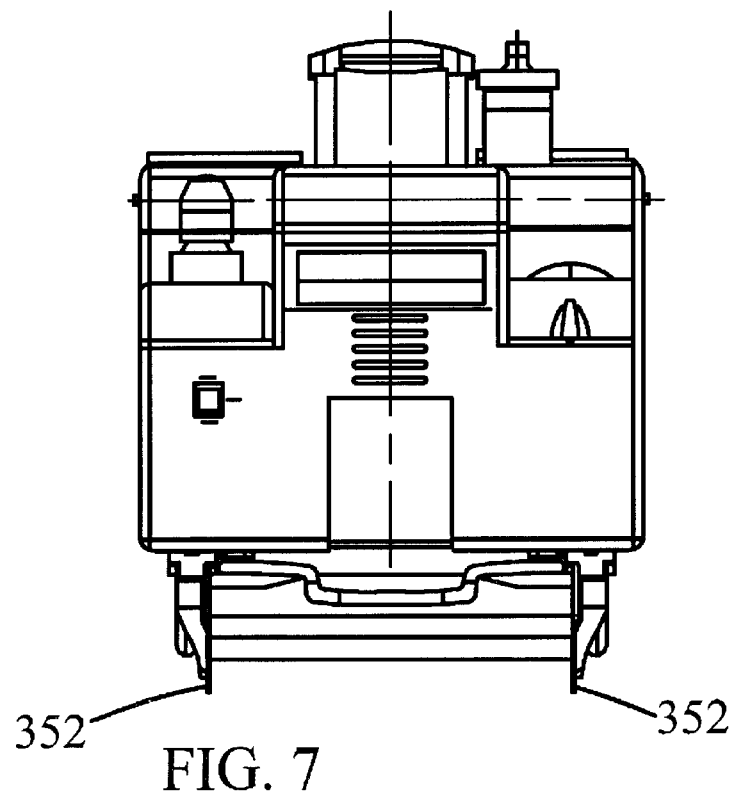
FIG. 7 is a front elevation of view of an alternative embodiment of the present invention.
Figure 8:
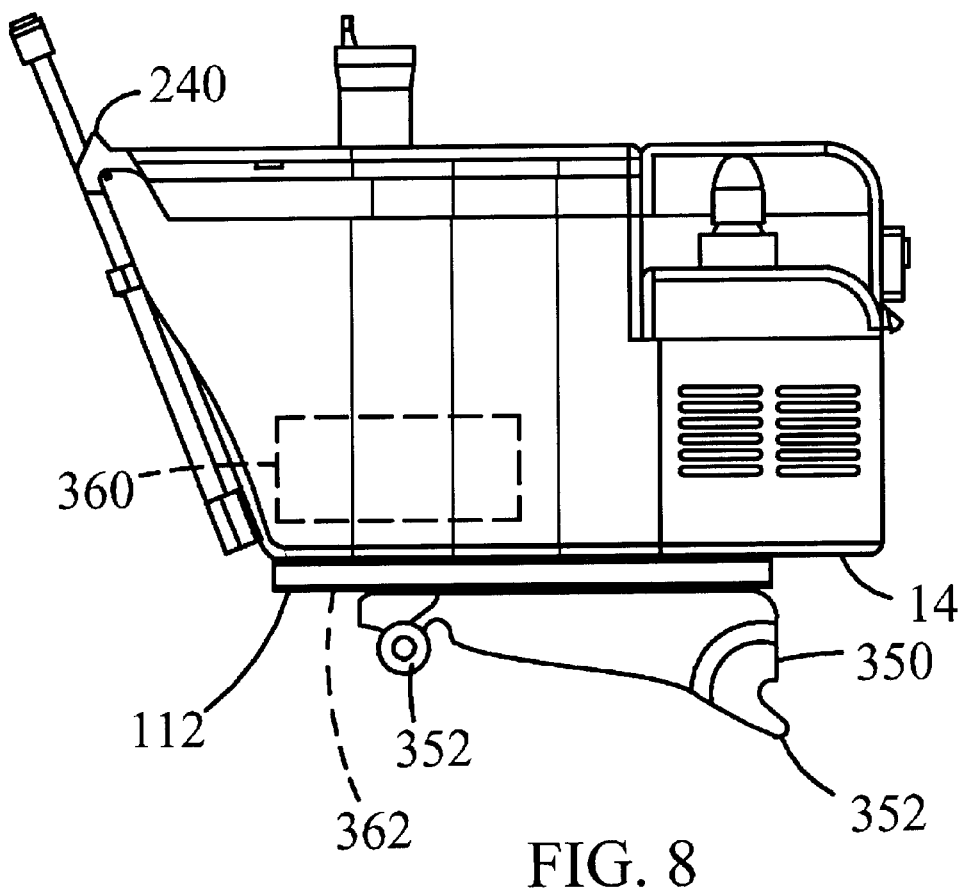
FIG. 8 is a side elevation of view of an alternative embodiment of the present invention.
Figure 9:
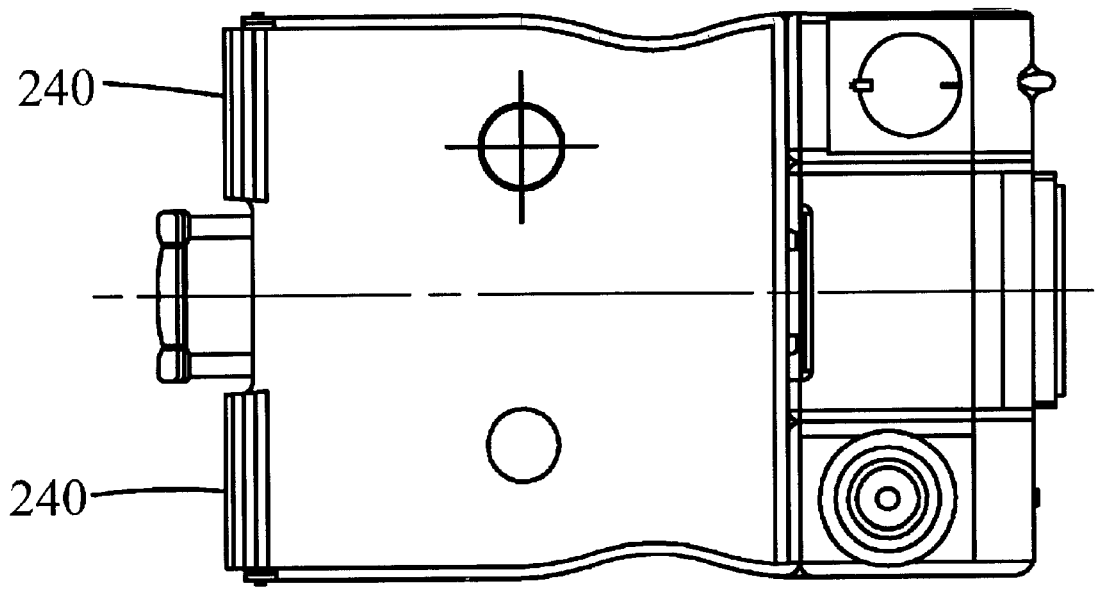
FIG. 9 is a top plan view of an alternative embodiment of the present invention.

Console 10 has a main interior compartment 16 that provides an area for housing a plurality of other features that will be discussed below. A lid 18 pivotally secured to console 10 for movement between an open position (FIGS. 3 and 4) and a closed position (FIG. 2) provides access to interior compartment 16. Lid 18 has an upper portion 20 and a lower portion 22. Upper portion 20 is pivotally secured to lower portion 22 for movement between an open position (FIG. 5) and a closed position (FIGS. 2–4). The open position provides an expanded surface area 24 sufficiently large enough to be used as a diaper changing table (FIGS. 1 and 5).

A two-piece retractable safety strap 26 provides a means for securing an infant to the changing table. Each end of safety strap 26 has a complementary latching mechanism 28 for securing to each other, for example, a male/female latching mechanism or complementary surfaces such as hook and loop type connectors sold of the type sold under the VELCRO trademark. In addition, it is contemplated that either or both safety straps 26 are secured to a retracting mechanism that will retract each safety strap 26 into upper portion 20 when their use is no longer necessary.

Console 10 is provided with a soft cushioned changing pad 27 that is placed upon surface area 24 in order to provide cushioning for an infant. As an alternative, upper portion 20 and lower portion 22 may have a changing pad fixedly secured to the complementary surfaces that provide surface area 24.

Upper portion 20 of lid 18 has a pair of cup receiving apertures 30 which align with a cup holder portion 36 of lower portion 22 when upper and lower portions 20 and 22 are positioned on top of each other (FIGS. 1–5). In this position, a cup holder 38 is defined by apertures 30 and cup holder portion 36. In an exemplary embodiment, a pair of cup holders are positioned on the upper surface of upper lid portion 20. The cup holders are sized and configured to receive and retain a portion of a drinking container such as a children's cup. Of course, it is contemplated that the size, location, and number of cup holders 38 may vary.

As an alternative, cup holder 36 is equipped with additional cup holders that protrude into the receiving area defined by cup holder 36. This will prevent spillage of the contents of a cup placed within cup holder 38 by preventing the same from being jostled or dislodged by the movement of the vehicle into which console 10 is secured.

Upper lid portion 20 has a stop member 40 located proximate to the pivotal securement of upper lid portion 20 to lower lid portion 22. Stop member 40 provides an upper limit to the pivotal movement of upper lid portion 20 with respect to lower lid portion 22, namely, the open position illustrated in FIGS. 3 and 4. Lid 18 is provided with a latching mechanism 42 for releasably engaging a latch 44. Upper lid portion 20 has a recessed handle portion 46 configured to allow an individual to grasp and pivot upper lid portion 20 with respect to lower lid portion 22. In addition, lower lid portion 22 has a pair of engagement tabs 48 for engaging a pair of complementary openings 50 in upper lid portion 20.

Referring now to FIGS. 3 and 4, interior compartment 16 houses a sanitary receiving receptacle 52. In an exemplary embodiment, receptacle 52 provides a sanitary means for receiving discarded items such as soiled diapers. Receptacle 52 includes a container 54 for disposing of and storing, e.g., soiled diapers. Container 54 includes a cover assembly 56 that releasably attaches to container 54. The fit between container 54 and cover assembly 56 is sufficiently close, so that with cover assembly 56 in place, container 54 is essentially airtight.

Container 54 is similar to a sanitary storage container disclosed in U.S. Pat. Nos. 5,813,200 and 6,128,890, the contents of which are incorporated herein by reference thereto.

Receptacle 52 is provided with an access door 53 in order to facilitate the removal of the soiled diapers. Access door 53 is positioned on a sidewall of receptacle 52 if receptacle 52 is fixedly secured within console 10. Alternatively, if receptacle 52 is removably secured within console 10 access door 53 can be on the lower surface or comprise the lower surface of receptacle 52. The removable securement of receptacle 52 within console 10 can be facilitated through the use of a snap in interference fit of a retaining mechanism. Alternatively, access door 53 will comprise the upper surface of receptacle 52. In this embodiment, receptacle 52 can be fixedly secured within console 10.

A removable storage bin 58 is configured to be removably received within a portion of receiving area 16. Removable storage bin 58 can be used as a storage bin or trash receptacle. Removable storage bin 58 has a handle or handle opening 59 that is configured to allow the fingers of an individual to grasp and pull out bin 58. As an alternative, a pair of handles 59 is positioned on opposite sides of bin 58.

A plurality of interior walls 60 define a plurality of storage receptacles 62, 64, 66 and 68. Storage receptacle 62 is configured and dimensioned to receive and retain a container 70. In an exemplary embodiment, container 70 is a case capable of storing a plurality of diaper wipes.

Storage receptacle 64 is further defined into a plurality of receiving areas 72 by a plurality of interior walls 74. Receiving areas 72 provide storage areas for useful items for caring for an infant. Such items include but are not limited to the following: powders, tissues, tissue box and complimentary holders, lotions, ointments, medicine and first-aid items.

Storage receptacle 66 is further defined into a plurality of receiving areas 76 by a plurality of interior walls 78. Each receiving area is configured to receive a plurality of diapers 80. Alternatively, storage receptacle 66 has a single receiving area for receiving a plurality of diapers 80.

Storage receptacle 68 is configured and dimensioned to receive a plurality of entertainment disks 82 and their associated covers. In an exemplary embodiment, entertainment disks 82 are DVD disks for use with a DVD player. In addition, other objects of similar dimensions may be stored in receptacle 68. Such items include, but are not limited to note pads, books, and adhesive note pads such as those sold under the POST IT trademark.

In addition, any of the aforementioned receptacles can be used to store children's toys, pacifiers and other items. Furthermore, each of these receptacles can be configured to be removeably stored within console 10. This feature will help facilitate in the cleaning and disinfecting of the same.

Referring now to FIGS. 1–5, console 10 is provided with a DVD player 84 having a flip top screen 86 that is pivotally mounted to console 10 for movement between a viewing position (FIG. 2) and a stowed position (FIGS. 3 and 5). In an exemplary embodiment, DVD player 84 and flip top screen 86 are similar to those used in the aviation industry to provide passengers (typically first-class passengers) with a selective viewing option on extended flights. Of course, it is contemplated that other entertainment systems such as VCRs, CD-players, and other magnetic media tape players and associated viewing screens can be used in lieu of DVD player 84 and flip top screen 86.

As flip top screen 86 is positioned into a viewing position, a pair of headphone jacks 88 is accessible for use with a pair of headphones 90. When the DVD player of console 10 is not in use, headphones 90 are stored within a headphone storage area 92 within interior compartment 16.

Figure 13:
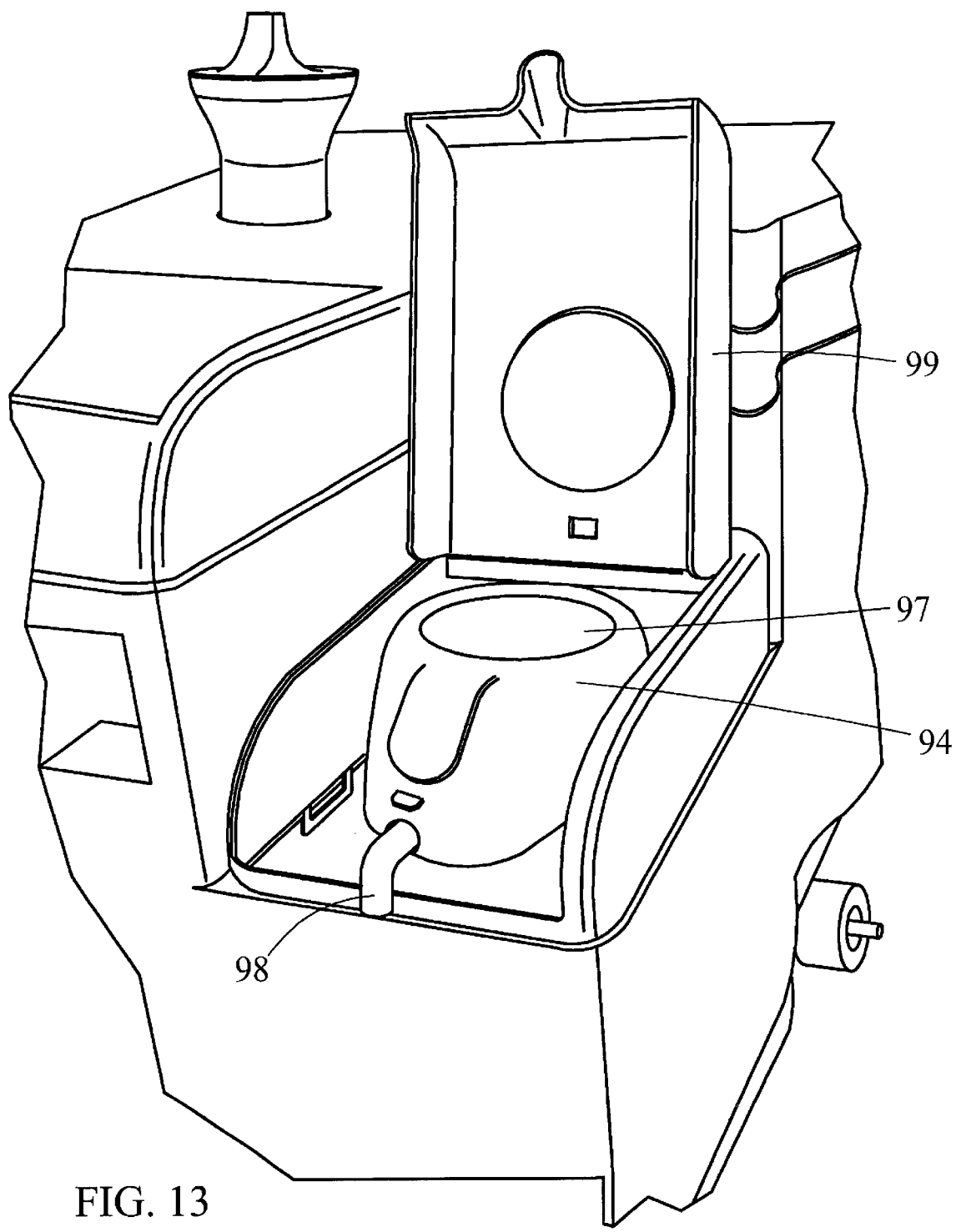
FIGS. 13–17 are views illustrating component parts and features of a multipurpose console constructed in accordance with an exemplary embodiment of the present invention.
Figure 14:
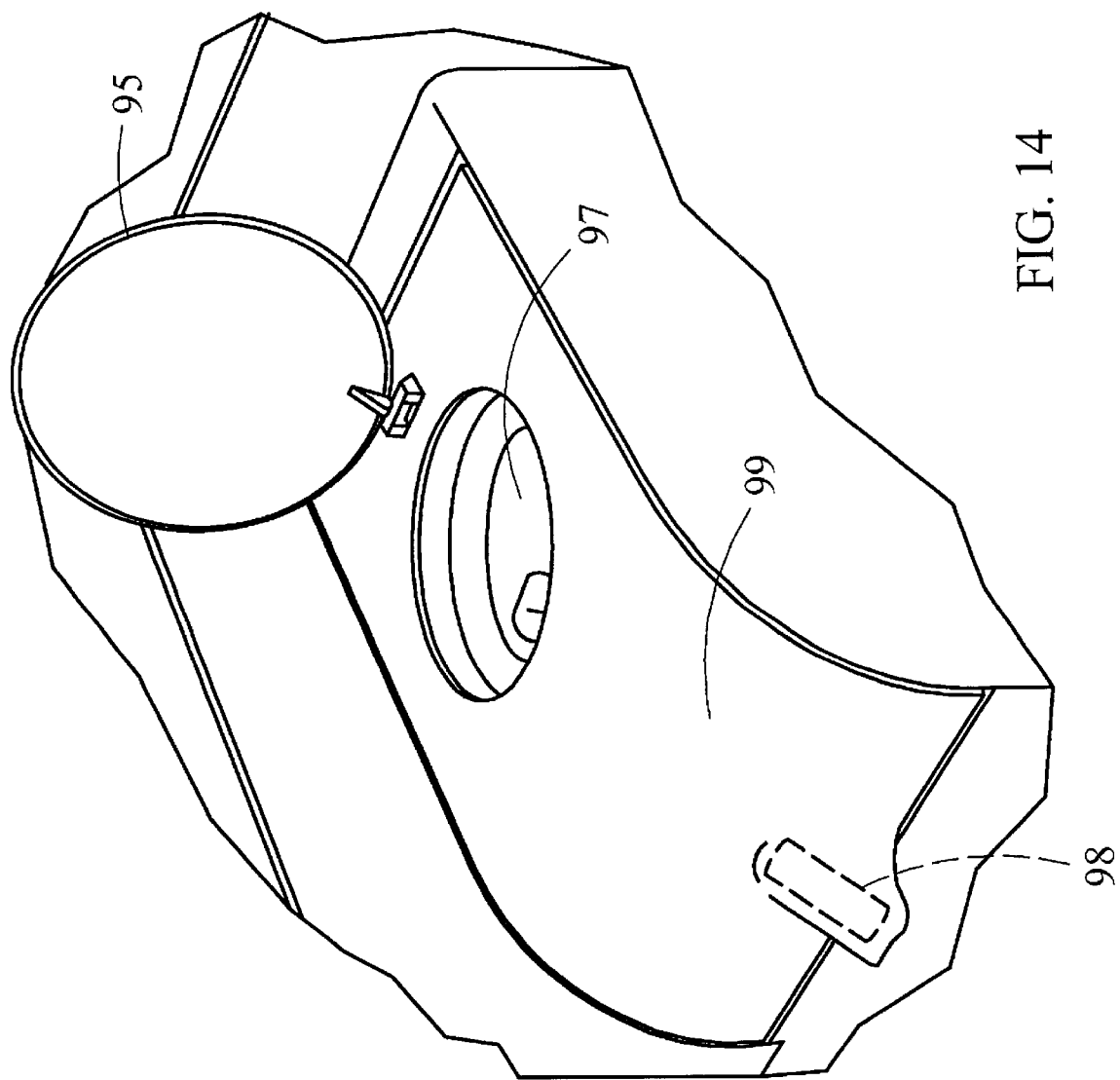
Figure 15:
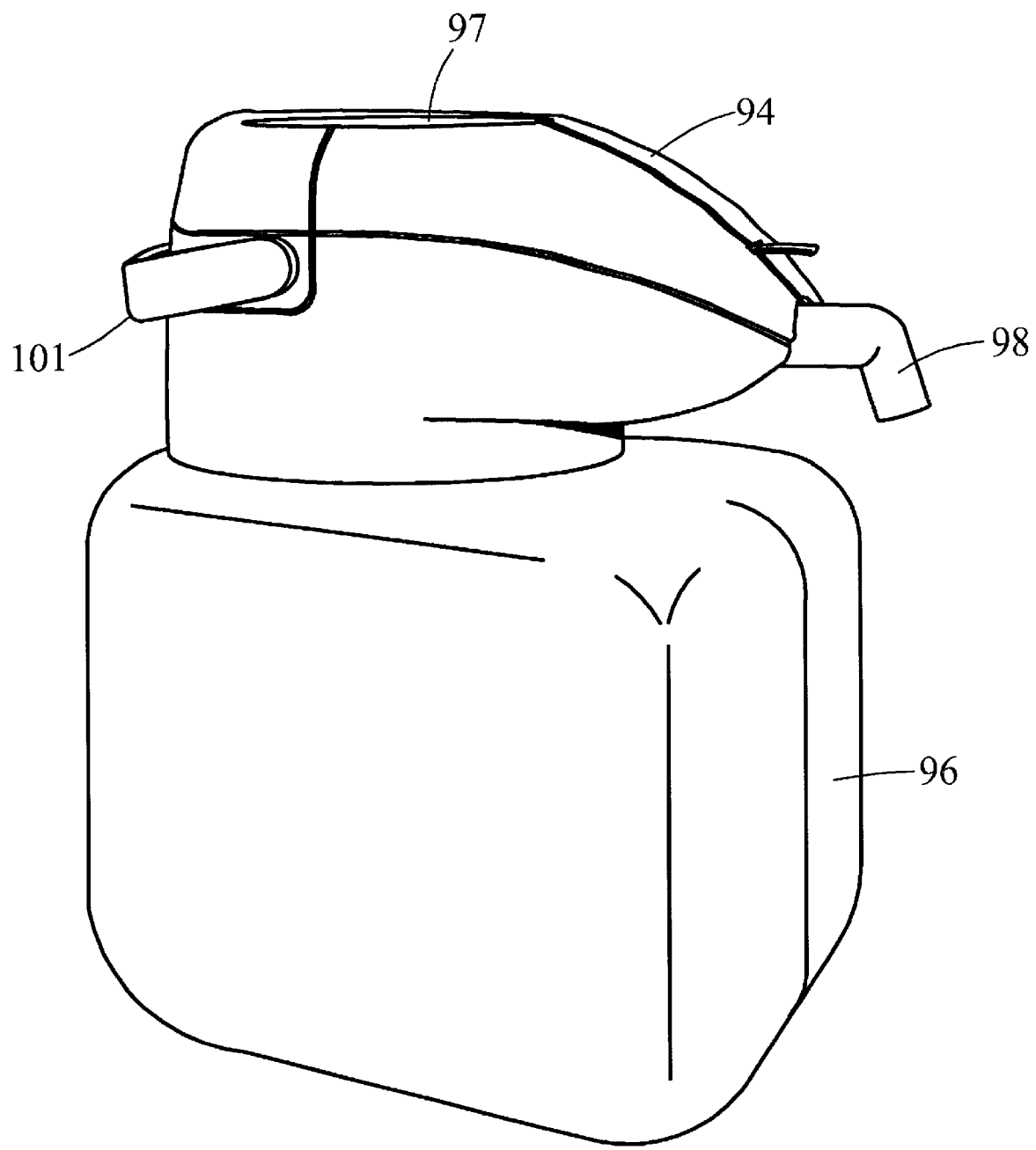

Console 10 is also provided with a water dispenser 94. (see also FIGS. 13–15) Water dispenser 94 has a reservoir 96 for storing a quantity of water or other liquid that is dispersible to a dispenser or spigot 98. As an alternative, reservoir 96 is removably secured within console 10 in order to facilitate the cleaning of the same. In order to disperse the liquids from water dispenser 94 an access lid 95 is pivoted into an open position (FIG. 14) and a force is applied to a plunger portion 97 causing the liquid to be dispersed from spigot 98.

In addition, console 10 is provided with an access door 99. Access door 99 is pivotally secured to console 10 in order to allow an individual to remove dispenser 94 and reservoir 96 from console 10 in order to facilitate the cleaning and filling etc. of the same. In addition, a handle 101 is secured to water dispenser 94. Handle 101 allows for convenient removal of water dispenser 94 from console 10.

Console 10 is also provided with a hot/cold cup holder/bottle warmer 100. Hot/cold cup holder 100 has a receiving area 102 for receiving a portion of a drinking vessel (soda can or baby bottle) which can be either heated or cooled by a thermoelectric device 104 or other device capable of providing a cooling or heating function. In an exemplary embodiment, thermoelectric device 104 is a thermal electric module capable of providing the thermodynamic output necessary to either heat or cool a vessel within cup holder 100.

Thermoelectric device 104 is activated by a selector switch 106 located on the surface of console 10. Selector switch 106 is positionable from an off position to either a heating or cooling position.

A bottle warming sleeve 108 is received and stored within a warming sleeve storage area 110 also positioned within receiving area 16.

Figure 16:
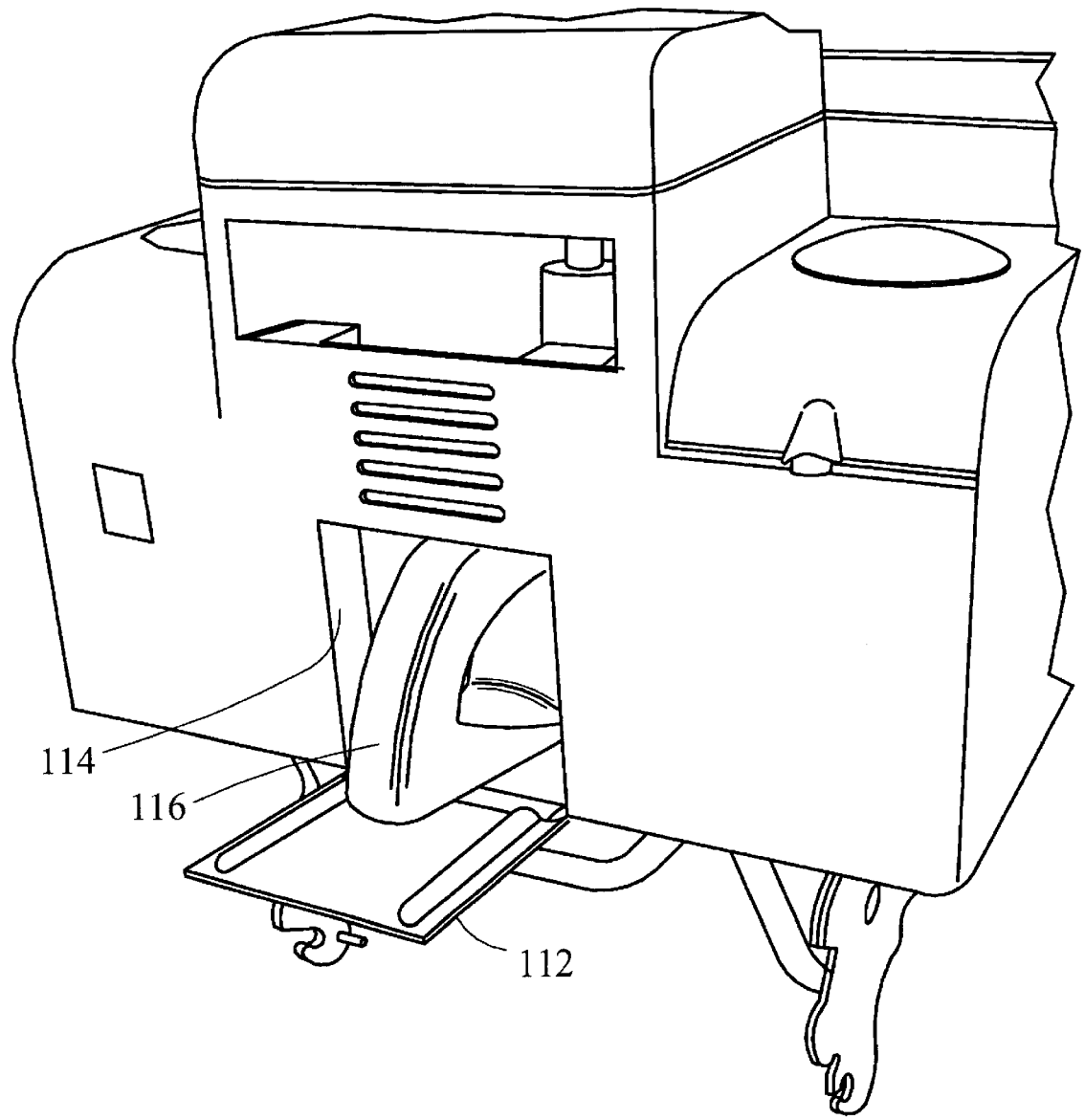

Console 10 has an access door 112 which allows a user to access an interior compartment 114. In an exemplary embodiment, interior compartment 114 is configured and dimensioned to house a portable vacuum cleaner 116. (See also FIG. 16) Vacuum cleaner 116 is a dry/wet vacuum capable of being battery operated and or operated from a cigarette adapter outlet.

Console 10 is also provided with a plurality of vent apertures 118. Vent apertures 118 allow heat generated by DVD player 84, DVD screen 86 and thermoelectric device 104 to escape from the inside of console 10 as well as allowing ambient or cool air to enter.

Referring now to FIGS. 6–9, an alternative embodiment of the present invention is illustrated where component parts performing similar or analogous functions are labeled in multiples of 100. Here, console 210 is provided with a portable chassis 350. Portable chassis 350 is releasably secured to a locking mechanism 112 in a similar manner as the locking engagement of mechanism 112 to the existing mounting features of a vehicle. Portable chassis 350 includes a plurality of rotatable wheels 352. In addition, a telescoping handle 354 is secured to a side wall of console 210. Accordingly, and as telescoping handle 354 is extended, an individual may grasp the handle and utilize console 210 in applications remote from the vehicle from which console 210 has been installed.

For example, console 210 may be used in temporary excursions away from the vehicle for daily activities and routine tasks such as shopping and/or visiting friends. Alternatively, console 210 may be used for more extended time periods away from the vehicle, such as overnight stays in hotels and/or camping trips.

In order to provide a source of power for the electrical components of console 210 in these applications, a battery supply 360 is incorporated into console 210. In an exemplary embodiment, battery supply 360 is a rechargeable source of power having a connector 362 which, in this case, is compatible to receive a recharging voltage from either a vehicle's electrical system or a standard wall outlet. Of course, necessary adapters and power converters are contemplated to be incorporated into connector 362 for recharging battery supply 360. It is also contemplated that console 210 can be equipped with a disposable power supply for either running the article apparatus of console 210 or maintaining a minimal amount of power.

Thus, console 10 provides a means for entertaining and caring for an infant while also being configured to be removably installed within a vehicle. In addition, console 10 provides other features such as storage areas, cup holders, and drink warmers/coolers. Moreover, console 10 is constructed to make use of an existing automotive design, thus, no costly modifications to the vehicle are required. Additionally, console 10 is portable and can provide a source of entertainment as well as caring for an infant and/or providing a storage receptacle for a plurality of items.

The embodiment of FIGS. 6–9 also illustrates an alternate exemplary embodiment of a stop member 240. The stop member 240 is located proximate to the pivotal securement of upper lid portion to lower lid portion. Stop member 240 provides an upper limit to the pivotal movement of upper lid portion with respect to lower lid portion, namely, the open position.

Figure 17:
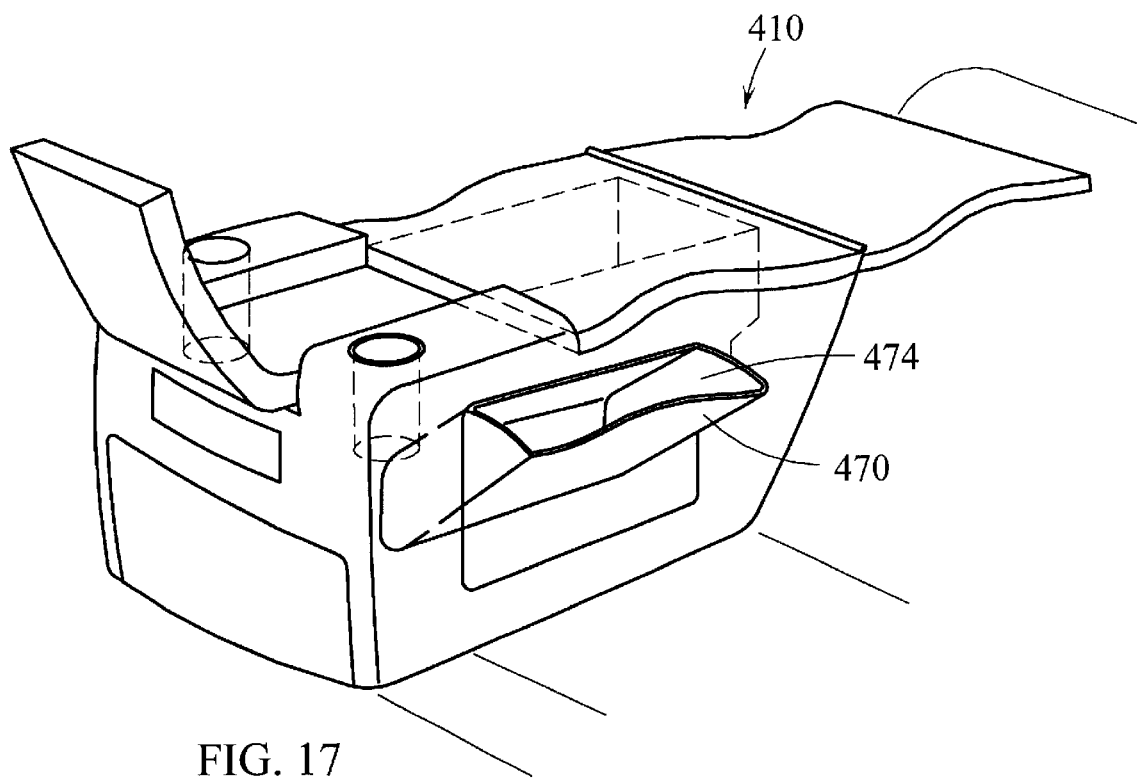
Figure 18:
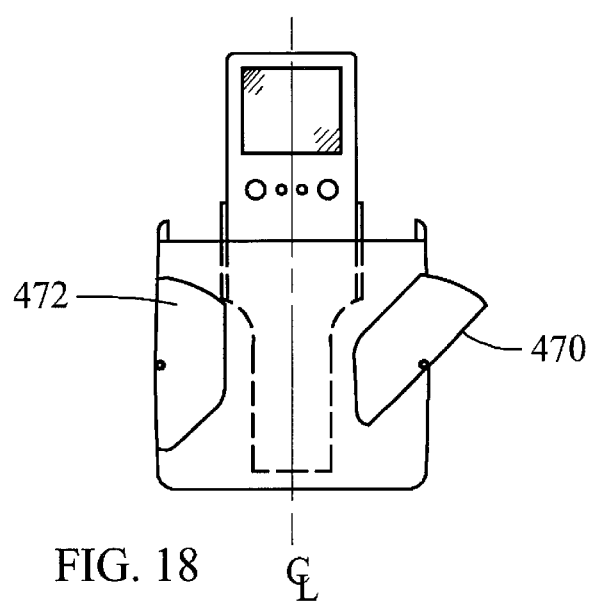
FIG. 18 is an end view of the FIG. 17 embodiment.
Figure 19:
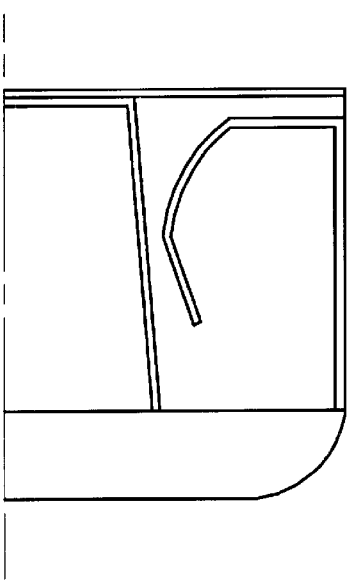
FIGS. 19–21 are orthographic views of another alternative embodiment of the present invention.
Figure 21:
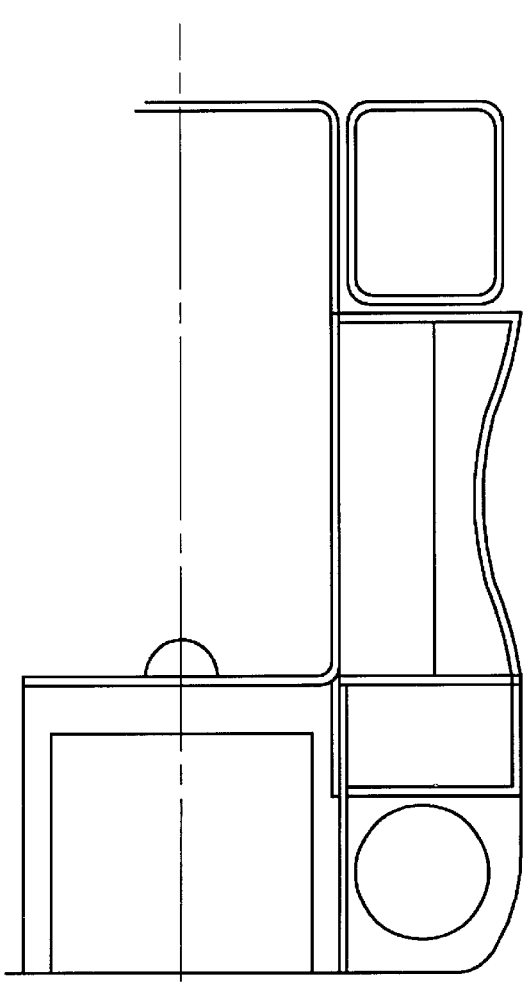
Figure 20:
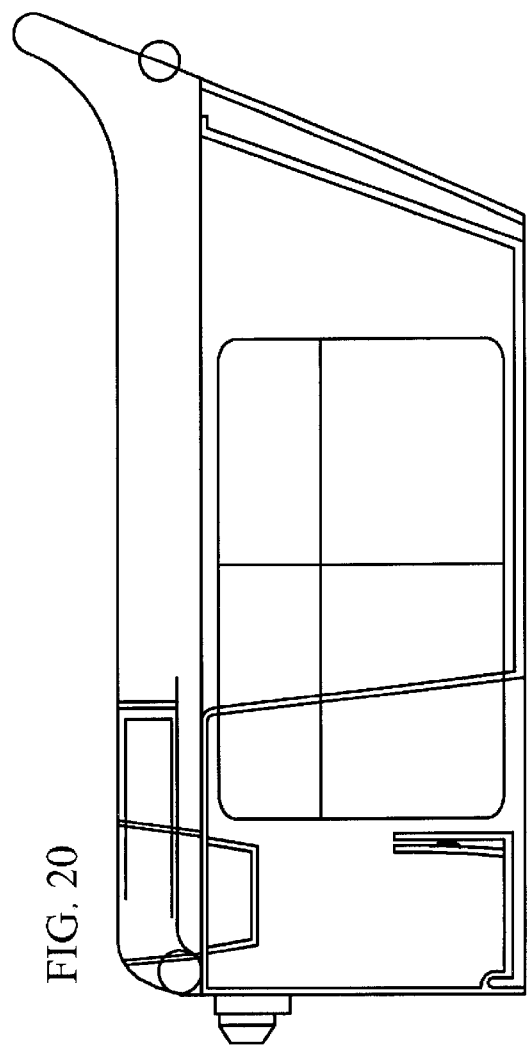

Referring now to FIGS. 17 and 18, another alternative embodiment is illustrated. Here multipurpose console 410 has a pair of side opening bins 470 which pivot outwardly from a side pocket 472. Side bins 470 are configured to provide a storage area 474 into which a plurality of items may be stored.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A multipurpose console for use in a vehicle, comprising:
   a) a support structure having an upper portion and a lower surface and defining an internal compartment;
   b) a latching mechanism being fixedly secured to said lower surface of said support structure, and being configured and dimensioned to releasably engage a mounting member of a vehicle; and
   c) a lid pivotally secured to said upper portion for movement between a first position and a second position, said lid being configured, dimensioned and positioned to cover said internal compartment when said lid is in said first position, said lid having an upper portion and a lower portion, said upper portion being pivotally secured to said lower portion for movement between said first and second positions, said upper portion and said lower portion defining a surface area when said upper portion is in said second position, said surface area being large enough to provide an area for changing a child's diaper; and
   d) a retractable safety strap secured to said lid, said retractable safety strap having a first strap portion being fixedly secured to said lid at one end and a first connector portion at the other, said first connector portion being configured and dimensioned to engage a second connector portion secured to one end of a second strap portion having its other end secured to said lid.

2. A multipurpose console as in claim 1, further comprising:
   e) an electronic entertainment device.

3. A multipurpose console as in claim 2, wherein said electronic entertainment device is a DVD player and DVD screen, said DVD screen being pivotally mounted to said multipurpose console for movement between a deployed position and a closed position.

4. A multipurpose console as in claim 1, wherein said internal compartment includes a plurality of storage compartments, one of said plurality of storage compartments being configured and dimensioned to receive and store a plurality of diapers.

5. A multipurpose console as in claim 4, wherein one of said plurality of storage compartments is a removable container.

6. A multipurpose console as in claim 4, wherein one of said plurality of storage compartments is configured to receive and store a plurality of DVD disks.

7. A multipurpose console as in claim 1, further comprising:
   e) a pair of cup holders being configured, dimensioned and positioned to receive and engage a portion of a cup.

8. A multipurpose console as in claim 1, further comprising:
   e) a portable vacuum, said portable vacuum being stored within a storage area accessible through an access door positioned on an exterior surface of said support structure.

9. A multipurpose console as in claim 1, further comprising:
   e) an electronic device for heating or cooling an interior surface of a receptacle positioned on said upper surface of said support structure.

10. A multipurpose console as in claim 1, further comprising:
    e) a reservoir having a spigot for dispersing the contents of said reservoir.

11. A multipurpose console as in claim 1, further comprising:
    e) a mobile assembly being configured and dimensioned for securement to said latching mechanism, said mobile assembly having a plurality of wheels being configured and dimensioned to make contact with a surface when said mobile assembly is secured to said latching mechanism.

12. A multipurpose console as in claim 11, further comprising:
    f) a telescoping handle secured to an outer surface of said support structure.

13. A child care console adapted for being mounted within a vehicle, comprising:
    a housing body having an internal compartment;
    a latching mechanism being fixedly secured to a lower surface of said housing body and being configured to releasably engage a mounting member of the vehicle;
    a deployable member movably mounted to said housing body, said deployable member being configured for movement between a stowed position and a deployed position, wherein said deployable member provides a diaper changing area in said deployed position; and
    a changing pad secured to said diaper changing area.

14. The child care console as in claim 13, wherein movement of said deployable member between said stowed position and said deployed position also moves said changing pad between said stowed position and said deployed position.

15. The child care console as in claim 13, further comprising a safety strap secured to said child care console, said safety strap being positioned, dimensioned and configured for securing an infant to said diaper changing area during a diaper changing event.

16. The child care console as in claim 15, wherein said safety strap is retractable and has a first strap portion being fixedly secured to said deployable member at one end and a first connector portion at the other, said first connector portion being configured and dimensioned to engage a second connector portion secured to one end of a second strap portion having its other end secured to said deployable member.

17. The child care console as in claim 16, wherein said first and second connector portions are selected from the group consisting of male/female latching mechanisms and complementary hook and loop surfaces.

18. The child care console as in claim 13, wherein said deployable member provides a means for accessing and enclosing said internal compartment, said internal compartment being accessible when said deployable member is in said stowed position.

19. The child care console as in claim 18, wherein said diaper changing area is larger than the periphery of a side of said housing body.

20. The child care console as in claim 13, wherein said housing body further comprises a baby bottle warming and cooling device.

21. The child care console as in claim 13, wherein said internal compartment further comprises:
- a sanitary receiving receptacle, said sanitary receiving receptacle being configured to provide a sanitary means for storing soiled diapers.

22. The child care console as in claim 21, wherein said sanitary receiving receptacle includes a cover assembly, said cover assembly being moveable between an open position and a closed position, wherein said sanitary receiving receptacle and said cover assembly provide an essentially airtight storage area when said cover assembly is in said closed position.

23. A child care console adapted for being mounted within a vehicle, comprising:
- a housing body having an internal compartment;
- a latching mechanism being fixedly secured to a lower surface of said housing body and being configured to releasably engage a mounting member of the vehicle;
- a deployable member movably mounted to said housing body, said deployable member being configured for movement between a stowed position and a deployed position, wherein said deployable member provides a diaper changing area in said deployed position; and
- a sanitary receiving receptacle being defined in said internal compartment, said sanitary receiving receptacle being configured to provide a sanitary means for storing soiled diapers, wherein said diaper changing area is padded.

24. The child care console as in claim 23, wherein said sanitary receiving receptacle includes a cover assembly, said cover assembly being moveable between an open position and a closed position, wherein said sanitary receiving receptacle and said cover assembly provide an essentially airtight storage area when said cover assembly is in said closed position.

25. The child care console as in claim 24, wherein said sanitary receiving receptacle further comprises an access door in order to facilitate the removal of said soiled diapers.

26. The child care console as in claim 23, further comprising a safety strap secured to said child care console, said safety strap being positioned, dimensioned and configured for securing an infant to said diaper changing area during a diaper changing event.

* * * * *

UNITED STATES PATENT AND TRADEMARK OFFICE
Certificate

Patent No. 6,497,441 B1                    Patented: December 24, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Nicole M. Mahmood, New Carlisle, OH; Kenneth Alan Gassman, Springboro, OH; Frank X Kreiling, Bloomfield Hills, MI; and Sherry Phillips, Mayville, MI.

Signed and Sealed this Second Day of December 2003.

*D. GLENN DAYOAN*
*Supervisory Patent Examiner*
*Art Unit 3612*